US008577204B2

(12) United States Patent
Lin et al.

(10) Patent No.: US 8,577,204 B2
(45) Date of Patent: Nov. 5, 2013

(54) SYSTEM AND METHODS FOR REMOTE MANIPULATION OF VIDEO OVER A NETWORK

(75) Inventors: Borching Lin, Shindian (TW); Jau Hsiung Huang, Shindian (TW)

(73) Assignee: Cyberlink Corp., Shindian, Taipei (TW)

( * ) Notice: Subject to any disclaimer, the term of this patent is extended or adjusted under 35 U.S.C. 154(b) by 1377 days.

(21) Appl. No.: 11/559,026

(22) Filed: Nov. 13, 2006

(65) Prior Publication Data

US 2008/0112683 A1 May 15, 2008

(51) Int. Cl.
*H04N 5/93* (2006.01)

(52) U.S. Cl.
USPC .......................................... 386/278; 386/280

(58) Field of Classification Search
USPC ........................ 386/200, 241, 278, 281, 282
See application file for complete search history.

(56) References Cited

U.S. PATENT DOCUMENTS

| 5,818,439 A * | 10/1998 | Nagasaka et al. ............ 725/87 |
| 6,029,194 A | 2/2000 | Tilt |
| 6,163,510 A * | 12/2000 | Lee et al. ...................... 386/281 |
| 6,166,731 A | 12/2000 | Duvall et al. |
| 6,735,253 B1 | 5/2004 | Chang et al. |
| 6,882,793 B1 * | 4/2005 | Fu et al. ........................ 386/241 |
| 7,493,014 B2 * | 2/2009 | McGrath et al. .............. 386/248 |
| 2002/0069218 A1 | 6/2002 | Sull et al. |
| 2002/0116716 A1 * | 8/2002 | Sideman .......................... 725/91 |
| 2003/0018974 A1 * | 1/2003 | Suga .............................. 725/86 |
| 2004/0150663 A1 * | 8/2004 | Kim ............................. 345/723 |
| 2005/0033758 A1 * | 2/2005 | Baxter .......................... 707/100 |
| 2005/0058430 A1 * | 3/2005 | Nakamura et al. ............. 386/52 |
| 2007/0162568 A1 * | 7/2007 | Gupta et al. .................. 709/219 |

* cited by examiner

*Primary Examiner* — Huy T Nguyen

(74) *Attorney, Agent, or Firm* — McClure, Qualey & Rodack, LLP (57) ABSTRACT

A remote video editing system is provided for editing a video from a remote location without the need to locally save the video every time an edit is made. Briefly described, one embodiment, among others, includes the steps of analyzing characteristics of the video and embedding the information into the video; storing the video and the embedded information at an editing server; receiving edit instructions from a client at the editing server; creating a project file containing the edit instructions received; and editing the video based on the project file.

23 Claims, 8 Drawing Sheets

SYSTEM AND METHODS FOR REMOTE MANIPULATION OF VIDEO OVER A NETWORK

TECHNICAL FIELD

The present disclosure is generally relates to media editing and, more particularly, relates to a system and method for remote editing of video over a network.

BACKGROUND

In recent years, an increasing number of users have access to vast selections of videos through the Internet, given the ever growing number of individuals who have high-speed access at home. With the wide range of compression techniques available, high-resolution video clips can be transferred within a reasonable time over the Internet. Furthermore, with the vast array of video editing tools available, many people can readily edit existing video and incorporate special effects to customize videos and to produce stylish graphics. These videos may later be published for friends and family to view.

Currently, however, video editing is typically performed locally on individual workstations (e.g., personal computers) and is generally limited to a single user for each copy of a video file. Multiple users generally cannot take part in the editing process of a particular video without first downloading and storing a separate copy of the video. Depending on the size of the video (e.g., 4.7 GB for 2 hours of video stored in MPEG-2 format), the downloading process can be extremely slow and time-consuming, even with a high-speed connection. Consider the following scenario. Suppose an individual wanted to incorporate some special effects into a video that a friend has published on a web site. That individual would have to first download a copy of the video and store the video locally on his hard drive before incorporating any changes. Furthermore, in order to allow others to view the video on the network, the individual would have to then upload the completed work. This results in utilization of valuable bandwidth on the network. Suppose now that the individual wanted to make additional edits later on to create a $2^{nd}$ revision, $3^{rd}$ revision and so on. If the individual did not save a backup copy locally, the target video (i.e., the video to be edited) would have to be once again downloaded, edited, and finally uploaded back up to the server. Furthermore, with each successive edit, the quality of the video is inherently degraded every time it is decompressed, edited and then recompressed. Finally, each successive edit is permanent. That is, the user cannot revert back to a previous edit unless another copy was saved before the current edits were made. A separate copy of the target video would have to be saved for each revision. This approach, however, would require a tremendous amount of storage space in order to accommodate different copies reflecting different revisions of the video.

Therefore, there exists a need, among others, for providing multiple users with the ability to remotely edit video stored at a centralized location without the need to first download the entire video file in order to provide collaborative video editing among different users. Furthermore, there exists a need, among others, for providing users with the ability to make multiple edits without the need to download and upload multiple copies and to be able to access previous revisions of the video.

SUMMARY

The present invention is directed to systems and methods for editing a video from a remote location without the need to locally save the video every time an edit is made. Briefly described, one embodiment, among others, includes the steps of storing the video at an editing server in a video file, analyzing characteristics of the video and storing the information as metadata associated with the video, receiving edit instructions from a client at the editing server, creating a project file containing the edit instructions received, and editing video based on the project file and the video file.

Another embodiment may be implemented as a system for remotely editing a video over a network comprising an analysis module for identifying characteristics of the video and associating the characteristics with the video, and an editing server for storing the video in a video file, creating a project file based on the edit instructions, editing video based on the project file and video file, and transmitting the edited video to the client.

Another embodiment may be implemented as a system for remotely editing a video over a network one or a plurality of clients for generating edit instructions, and an editing server in communication with the plurality of clients, the editing server configured to receive the edit instructions, create project files, edit the video based project file.

Yet another embodiment of the system may comprise a computer-readable medium having a computer program for providing remote editing of a video comprising logic configured to store the video as a video file, logic configured to identify characteristics of the video and associate the characteristics with the video, logic configured to process edit instructions for modifying the video file, logic configured to create a project file, and logic configured to modify the video file based on the project file.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of a system for remotely editing video and the underlying methods can be better understood with reference to the following drawings. The components in the drawings are not necessarily to scale, emphasis instead being placed upon clearly illustrating the principles of remote video editing system. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
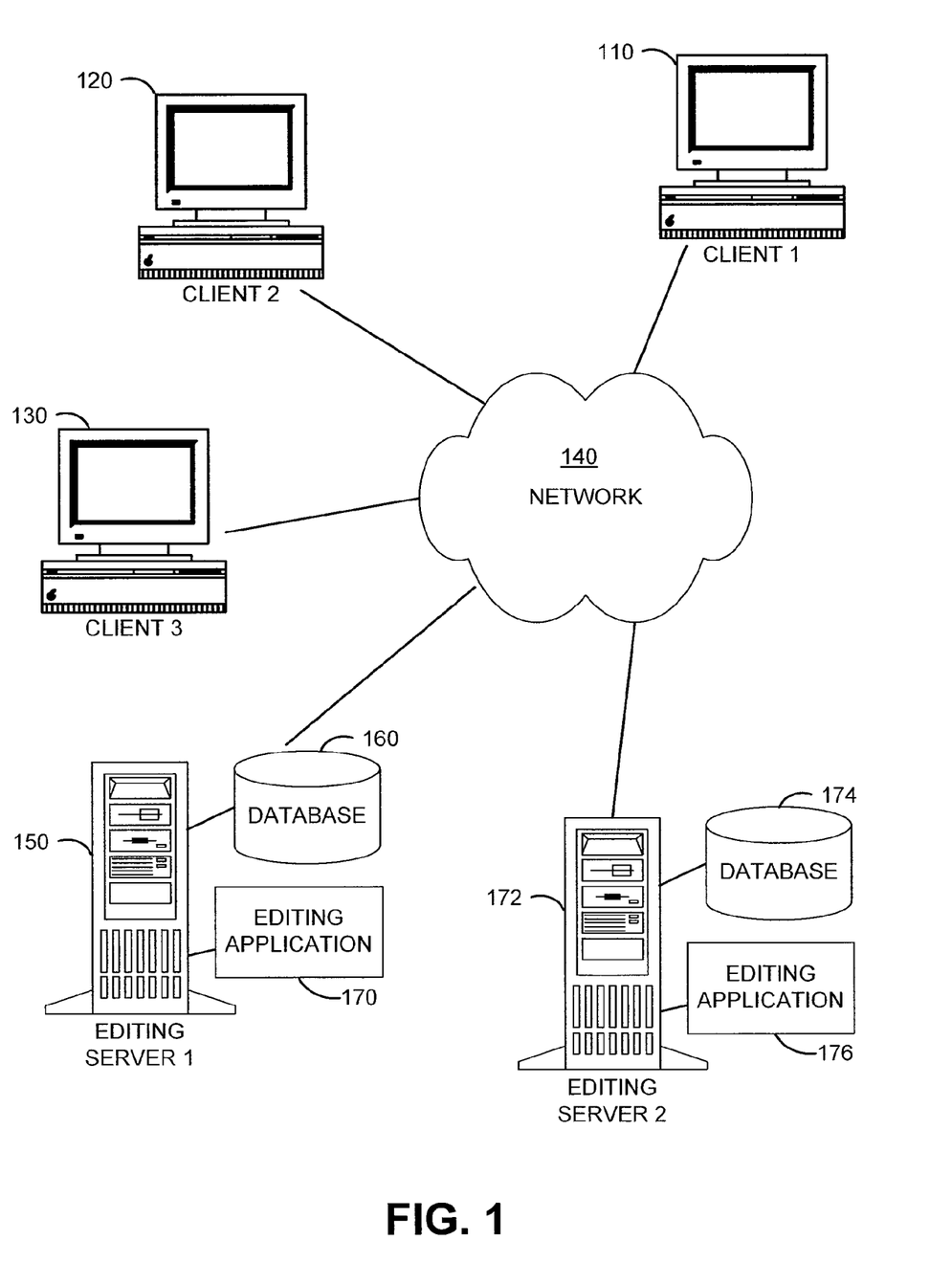
FIG. 1 depicts a block diagram of one embodiment of a remote video editing system.

Reference is now made to FIG. 1, which depicts a block diagram of one embodiment of the remote video editing system. The system includes clients 110, 120, 130 and an editing server 150. The clients 110, 120, 130 may be any of a wide variety of computer systems or workstations such as personal computers, for example. The clients 110, 120, 130 may be connected through a network 140, which may, for example, be a LAN, WAN, or the Internet. The editing server 150 may also form a node on the network. The connection between the clients 110, 120, 130 and the editing server 150 may be any number of standard networking interfaces. One of ordinary skill in the art will appreciate that the physical medium connecting the clients 110, 120, 130 and the editing server 150 to the network 140 is not limited to any particular medium and may be comprised of, but not limited to, a wireless connection, an Ethernet connection, etc. The editing server 150 includes a database 160 or some type of storage device to store media content and executable modules therein.

The editing server 150 also includes an editing application 170 which provides project-based video editing functionality. The editing application 170 reads project files and then modifies target videos according to edit instructions stored within the project files. A key aspect of certain embodiments of the present invention is the fact that the target video is left unmodified and in its original state upon transmission of the video to the client that submitted the edit requests. Note that the target video may be formatted in a wide variety of formats, including compressed formats. For example, the video may be stored as an Audio Video Interleave® (AVI) file, a QuickTime® (QT) file, a Windows Media Audio® (WMA) file, a Windows Media Video® (WMV) file, an Advanced System File® (ASF) file or any popular digital multimedia format. The above exemplary video formats are merely examples, and it is intended that the system cover types of multimedia format in its broadest sense. Finally, one should also note that in certain embodiments of the invention, there may be more than one editing server. FIG. 1 shows a second editing server 172 with a corresponding database 174 and corresponding editing application 176.

Within the editing server 150, the target video is stored as a video file upon being uploaded to the editing server 150. A modified version of the video file is generated in real time and then transmitted to the client upon a playback request. The video file is left unmodified and stored in the database 160 within the editing server 150. This provides a distributed editing environment where multiple users that are geographically dispersed may edit the same video remotely without overwriting a previous edit. Each set of edit instructions submitted by a separate user is recorded in a separate project file. Another key aspect of embodiments of the present invention is the savings in storage space. The editing server 150 only keeps a single copy of a given video file and simply generates separate project files for each client 110, 120, 130 that wishes to edit the video. This results in tremendous savings in memory storage on the editing server 150 and the various clients 110, 120, 130.

Yet another key aspect of embodiments of the present invention is the fact that each client can edit an entire video without the need to first download the video in its entirety. In one embodiment of the remote video editing system, the user simply previews a short segment of the video. For example, the user might view 30 seconds of a 2-hour long video to determine whether the video suits his needs. Furthermore, key characteristics associated with the video are displayed to the client by the editing server. As an example, some characteristics might include the identification of certain individuals (e.g., celebrities, friends, family members) within the video clip, the presence of certain objects (e.g., mountain, river). Based on the short preview and the presented characteristics of the video, the user selects the desired video and makes a selection from the host of edit instructions (e.g., "styles" comprised of a pre-defined set of edit instructions) presented by the editing server. This process is performed without the need to download the entire 2-hour long video and without the need to independently analyze the characteristics of the video.

Figure 2A:
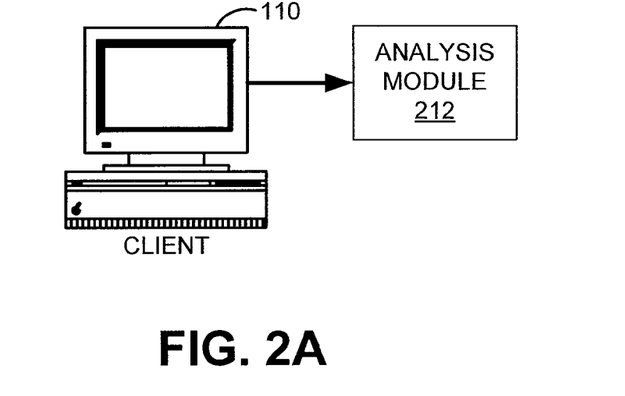
FIG. 2A depicts a block diagram illustrating various components of a client.

FIG. 2A depicts a block diagram illustrating various components of a client 110, 120, 130. The client 110, 120, 130 includes an analysis module 212, which processes new video to be edited. One should note that a given client may not necessarily contain an analysis module, however. In certain embodiments of the invention, the analysis is performed entirely by the editing server 150. Hence, the clients 110, 120, 130 would not include a separate analysis module. The client 110, 120, 130 would then only select from a pre-defined style and submit the edit request to the editing server 150.

The analysis module 212 functions to scan a new video to be edited and to identify key characteristics. Some examples of these characteristics may include, but are not limited to, brightness level, contrast level, detection of faces within the video, detection of motion within the video (e.g., panning or zooming shots), and detection of objects (e.g., mountains, rivers, houses). During the editing process, it may be helpful to determine various characteristics of the video to aid in identifying portions of interest within the video. The analysis module 212 identifies key characteristics and associates the information as metadata with the video. The video is then uploaded to the editing server 150 and made available for editing. Within the editing server 150, the uploaded video is stored as a video file. In one embodiment, the associated metadata may be embedded within the video file. In another embodiment, the associated metadata may be stored separately but linked to the video file. The metadata is later used by the editing server 150 in editing video. In an alternate embodiment, the analysis module 212 may be located within the editing server 150 so that the identification of key characteristics and creation of metadata can be performed either by the client 110, 120, 130 or the editing server 150.

When the analysis module 212 is implemented in software, if should be noted that the system can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this document, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 2B:
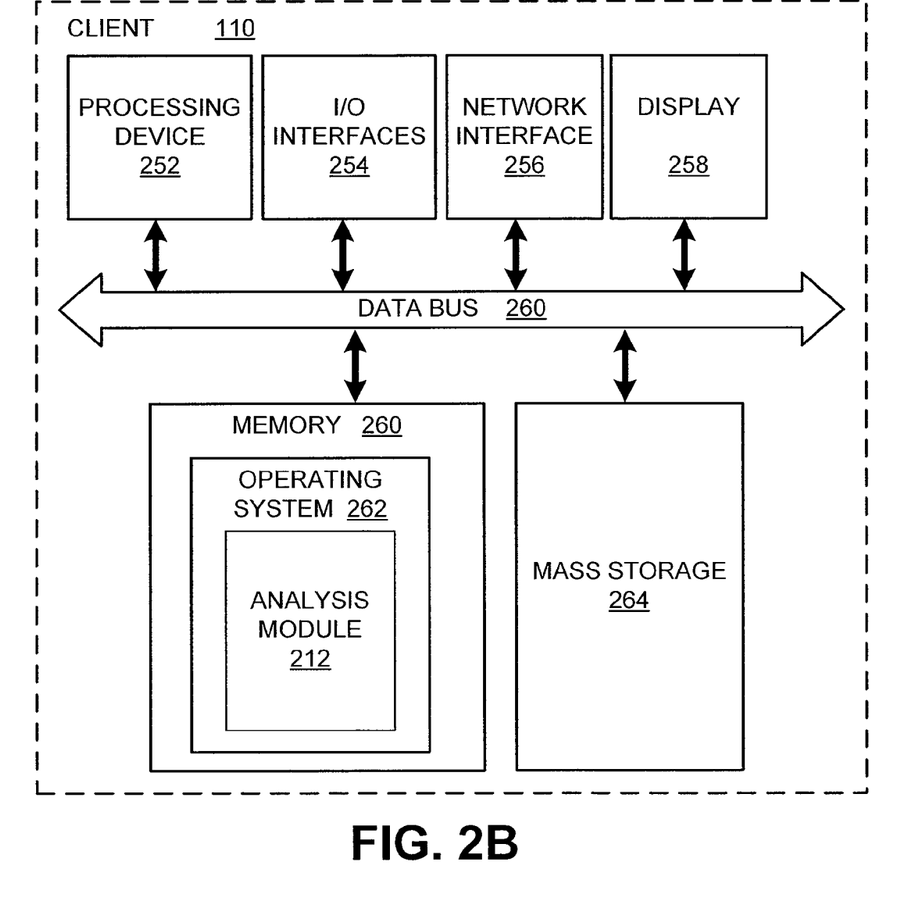
FIG. 2B depicts a block diagram illustrating an exemplary embodiment of the client on which the analysis module may be executed.

FIG. 2B depicts a block diagram illustrating an exemplary embodiment of the client 110, 120, 130 on which the analysis module 212 may be executed. Generally speaking, the client 110, 120, 130 can comprise any one of a wide variety of wired and/or wireless computing devices, such as a desktop computer, portable computer, dedicated server computer, multi-processor computing device, cellular telephone, personal digital assistant (PDA), handheld or pen based computer, embedded appliance and so forth. Irrespective of its specific arrangement, the client 110, 120, 130 can, for instance, comprise memory 260, a processing device 252, a number of input/output interfaces 254, a network interface device 256, and mass storage 264, wherein each of these devices are connected across a data bus 260. Display 258 can comprise a computer monitor or a plasma screen for a PC or a liquid crystal display (LCD) on a hand held device, for example.

Processing device 252 can include a custom made or commercially available processor, a central processing unit (CPU) or an auxiliary processor among several processors associated with the client 110, 120, 130, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 260 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 260 typically comprises a native operating system 262, one or more native applications, emulation systems, or emulated applications for any of a variety of operating systems and/or emulated hardware platforms, emulated operating systems, etc. For example, the applications may include the analysis module 212. One of ordinary skill in the art will appreciate that memory 260 can, and typically will, comprise other components which have been omitted for purposes of brevity.

Input/output interfaces 254 provide any number of interfaces for the input and output of data. For example, where the client 110, 120, 130 comprises a personal computer, these components may interface with a user input device 254, which may be a keyboard or a mouse. Where the client 110, 120, 130 comprises a handheld device (e.g., PDA, mobile telephone), these components may interface with function keys or buttons, a touch sensitive screen, a stylist, etc.

With further reference to FIG. 2B, network interface device 256 comprises various components used to transmit and/or receive data over network 140. By way of example, the network interface device 256 may include a device that can communicate with both inputs and outputs, for instance, a modulator/demodulator (e.g., a modem), wireless (e.g., radio frequency (RF)) transceiver, a telephonic interface, a bridge, a router, network card, etc.)

Figure 3A:
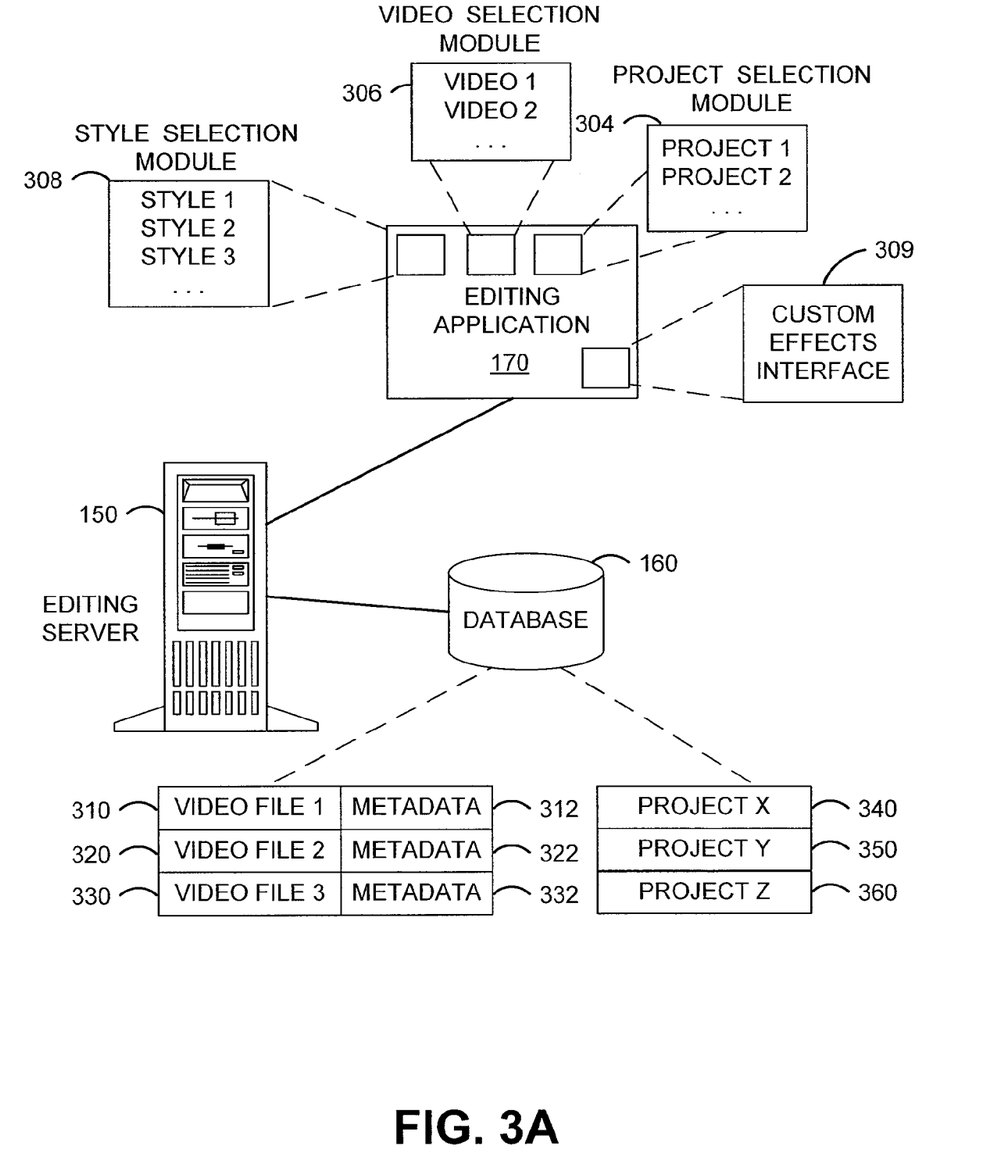
FIG. 3A depicts a block diagram illustrating various components of an editing server.

FIG. 3A depicts a block diagram illustrating various components of the editing server 150. In some embodiments, the editing server 150 includes a an editing application program 170 and a database 160 where an archive of video files 310, 320, 330 and associated metadata 312, 322, 332 are stored. These are videos which are available for editing. Furthermore, project files 340, 350, 360 that have been previously created are stored in the database 160 for future access. The application program 170 allows clients to communicate with the editing server 150 and to make editing decisions. The editing application 170 may include a project selection module 304, a video selection module 306, a style selection module 308, and a custom effects interface 309.

The project selection module 304 functions to provide the user with a list of project files to select from. The user may use this module to edit an existing project file to change the special effects to be incorporated into a video. Alternatively, the user may simply wish to view a modified video. Each project file is comprised of edit instructions to be incorporated into the video. In addition, each project file is associated with a target video to be modified. The editing engine in the editing server 150 generates the modified video and transmits the file to the client 110, 120, 130 that made the selection. The distinction between the video selection module 306 and the project selection module 304 is that users utilize the video selection module 306 to view unedited video (i.e., in its original state). On the other hand, users utilize the project selection module 304 to view edited video (i.e., video with special effects). Upon selection of a project, the edit instructions within the project file are incorporated into the video and then sent to the user to view.

The video selection module 306 performs the function of providing a list of video files available for editing or viewing. This list reflects the videos that have already been uploaded and stored on the editing server 150. The video archive on the editing server 150 may be comprised of videos uploaded by other clients 110, 120, 130 through the network 140. Alternatively, the client 110, 120, 130 may use the video selection module 306 to select a video to view in its unmodified state. Finally, a user may also elect to upload a new video to the editing server 150 to be stored and later edited.

The style selection module 308 functions to allow the user to choose from a set of styles comprised of pre-defined special effects. For example, STYLE 1 in the style selection module 308 might be a holiday style where the user can integrate a scrolling holiday greeting and a snow flurries effect into the video. As another example, STYLE 2 in the style selection module 308 might be a "bubbles theme" where the user can implement bubbles floating in the foreground of the video.

The custom effects interface 309 functions to allow the user to submit customized special effects. For example, the user may desire to place customized text into the video or to generate a customized zooming or panning motion. Custom effects like these are known in the art, and therefore, a detailed discussion of their implementation need not be described herein.

When the editing application 170 is implemented in software, if should be noted that the system can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this document, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

The video files 310, 320, 330 may be formatted in a wide variety of formats. For example, the video may be stored as an Audio Video Interleave® (AVI) file, a QuickTime® (QT) file, a Windows Media Audio® (WMA) file, a Windows Media Video® (WMV) file, an Advanced System File® (ASF) file or any popular digital multimedia format. The above exemplary video formats are merely examples, and it is intended that the system cover types of multimedia format in its broadest sense.

As discussed above, the metadata 312, 322, 332 is composed of key characteristics associated with the video. For example, some characteristics might include the identification of certain individuals (e.g., celebrities, friends, family members) within the video clip, the presence of certain objects (e.g., mountain, river). Based on the characteristics of the video, the user then submits a series of edit instructions to be incorporated into the video.

The project files 340, 350, 360 are composed of edit instructions received from the client 110, 120, 130. Upon receipt of a new series of edit instructions, a new project file is created. Furthermore, the video file to be edited is linked to the edit instructions within the project file. The editing engine 170 then performs the edit instructions and transmits the video to the client 110, 120, 130 that generated the edit instructions.

Figure 3B:
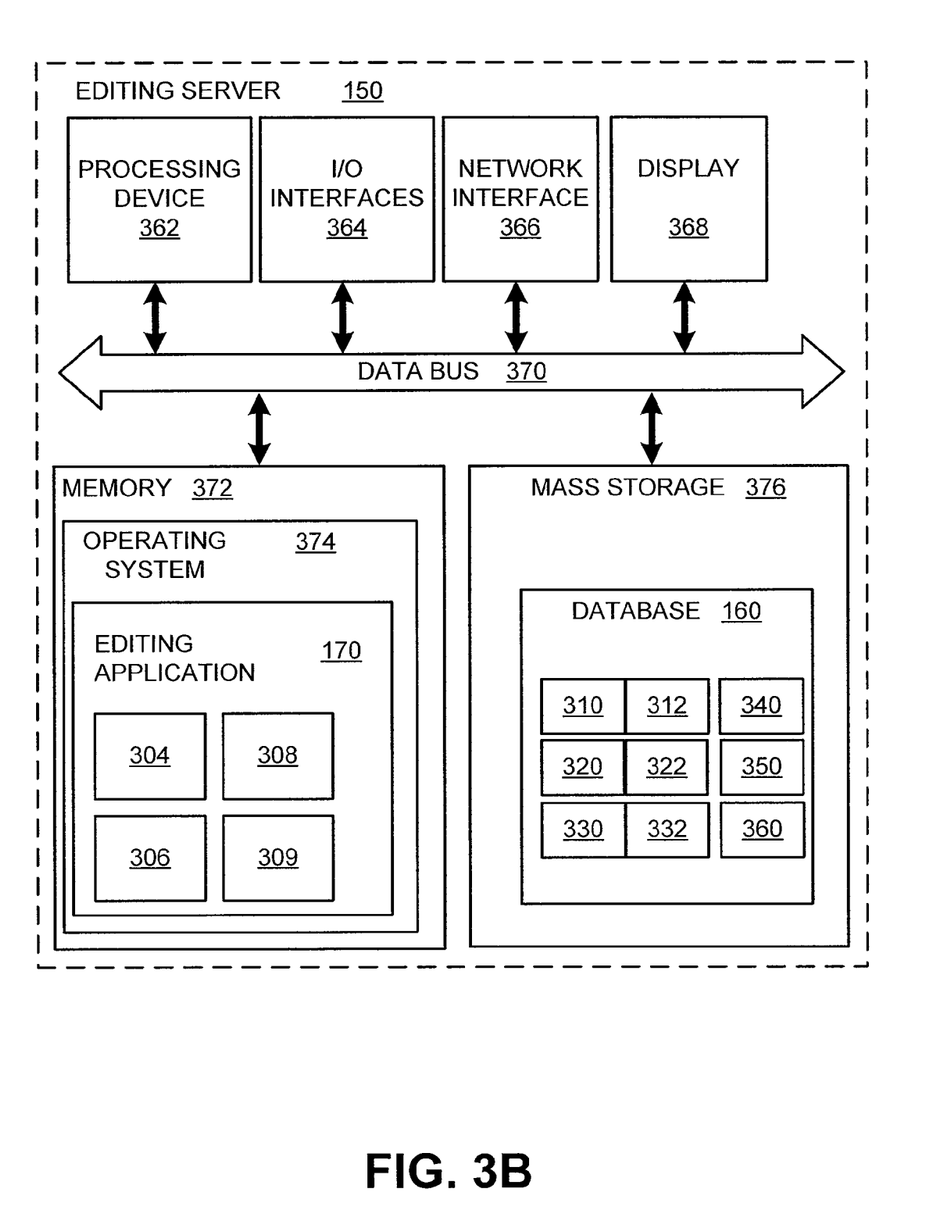
FIG. 3B depicts a block diagram illustrating an exemplary embodiment of the editing server on which the database and editing application may be located.

FIG. 3B depicts a block diagram illustrating an exemplary embodiment of the editing server 150 on which the database 160 and editing engine 170 may be located. Generally speaking, the editing server 150 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, the editing server 150 can, for instance, comprise memory 372, a processing device 362, a number of input/output interfaces 364, a network interface device 366, and mass storage 376, wherein each of these devices are connected across a data bus 370. Display 368 can comprise a computer monitor or a plasma screen for a PC or a liquid crystal display (LCD) on a hand held device, for example.

Processing device 362 can include a custom made or commercially available processor, a central processing unit (CPU) or an auxiliary processor among several processors associated with the editing server 150, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

Input/output interfaces 364 provide any of a number of interfaces for the input and output of data. For example, where the editing server 150 comprises a personal computer, these components may interface with a user input device 364, which may be a keyboard or a mouse. Where the editing server 150 comprises a handheld device (e.g., PDA, mobile telephone), these components may interface with function keys or buttons, a touch sensitive screen, a stylist, etc.

The memory 372 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 372 typically comprises a native operating system 374, one or more native applications, emulation systems, or emulated applications for any of a variety of operating systems and/or emulated hardware platforms, emulated operating systems, etc. For example, the applications may include the editing application 170. The editing application 170 may then include a project selection module 304, a video selection module 306, a style selection module 308, and a custom effects interface 309. One of ordinary skill in the art will appreciate that memory 260 can, and typically will, comprise other components which have been omitted for purposes of brevity.

The mass storage device 376 is used to store files such as uploaded video files 310, 320, 330, corresponding metadata 312, 322, 332 and project files 340, 350, 360. The files may be stored within a database 160 within the mass storage device 376 for immediate access.

With further reference to FIG. 3B, network interface device 366 comprises various components used to transmit and/or receive data over network 140. By way of example, the network interface device 366 may include a device that can communicate with both inputs and outputs, for instance, a modulator/demodulator (e.g., a modem), wireless (e.g., radio frequency (RF)) transceiver, a telephonic interface, a bridge, a router, network card, etc.)

Figure 4:
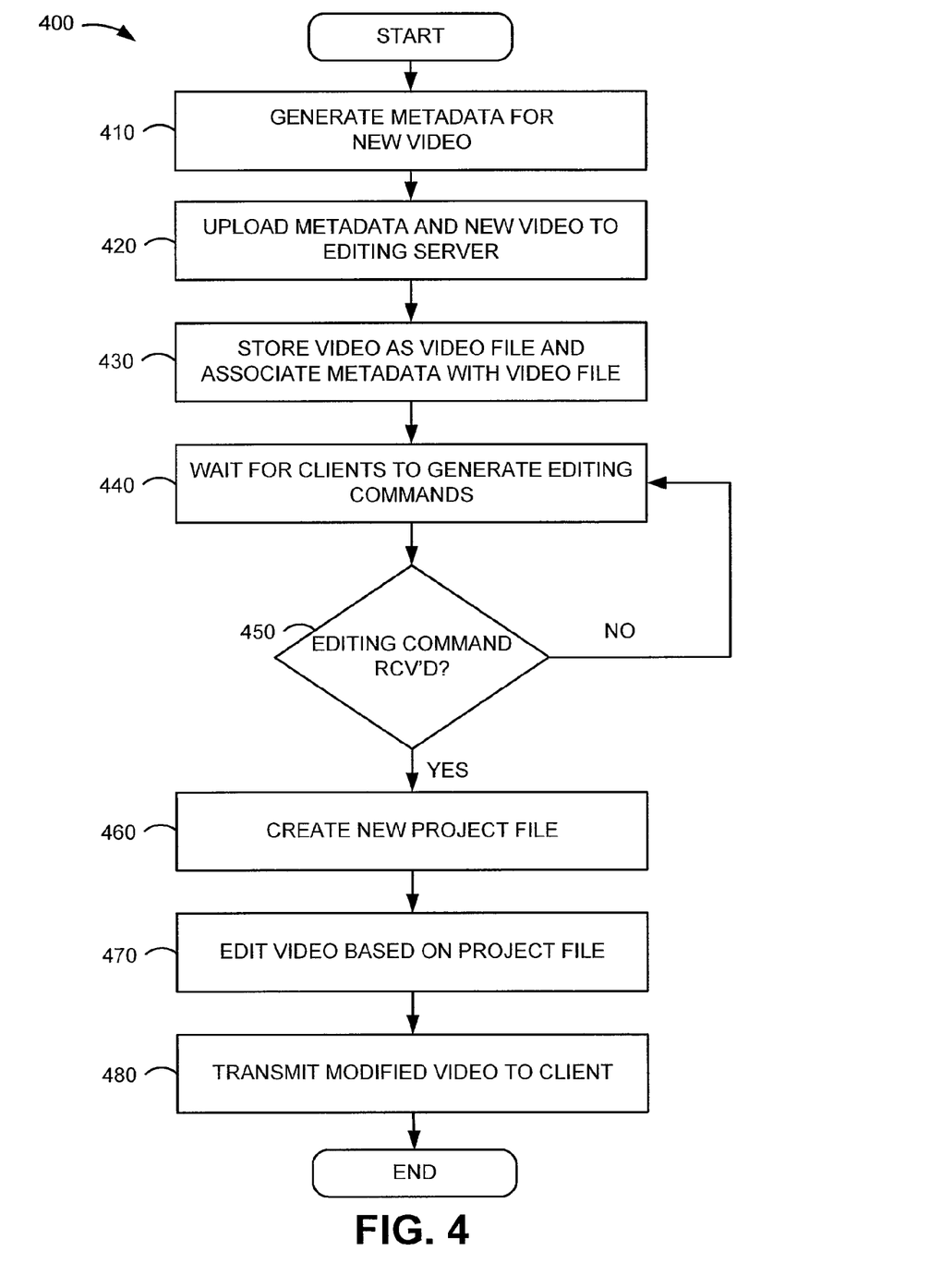
FIG. 4 is a flowchart of a top-level functional operation of a method for remotely editing a video.

FIG. 4 is a flowchart of a top-level functional operation of a method for remotely editing a video. Process descriptions, steps, or steps in flow diagrams should be understood as potentially representing modules, segments, or portions of code which include one or more executable instructions for implementing specific logical functions or steps in the process, and alternate implementations are included within the scope of the preferred embodiments of the remote video editing system in which functions may be executed out of order from that shown or discussed, including substantially concurrently or in reverse order, depending on the functionality involved, as would be understood by those reasonably skilled in the art.

In step 410, the new video to be edited is first scanned and analyzed by the client 110, 120, 130. Various characteristics associated with the video (e.g., brightness, contrast level, motion vector data) are retrieved and stored as metadata 312, 322, 332. Other attributes stored as metadata 312, 322, 332 might include faces or objects (mountains, rivers, etc.) identified within the video. In step 420, once the metadata 312, 322, 332 is created, it is ready to be saved along with the video on the editing server 150 for editing. One should note, however, that the metadata for the video can be either generated by the individual clients or generated by the editing server. In the event that the metadata is not generated by a client and sent to the editing server, the editing server will perform the analysis locally with its analysis module and create the metadata.

In step 430, once the video has been uploaded by the client 110, 120, 130 to the editing server 150 through the network 140, it is stored as a video file 310, 320, 330 in a database 160. In steps 440 and 450, the editing server 150 waits for the clients 110, 120, 130 to select and submit edit instructions.

In step 460, once an editing instruction has been received, a project file 340, 350, 360 is created which contains the editing command. The project file 340, 350, 360 is linked with the video file 310, 320, 330 to be edited. Finally, in steps 470, and 480, the editing engine 170 within the editing server 150 modifies video according to the commands in the project file 340, 350, 360 and transmits modified video to the client 110, 120, 130 that submitted the edit instructions.

One aspect of the remote video editing system is the fact that the target video file that was linked with the project file is not modified and remains in its original state. A modified video is generated by the editing engine 170 in real time and sent to the client 110, 120, 130.

Figure 5:
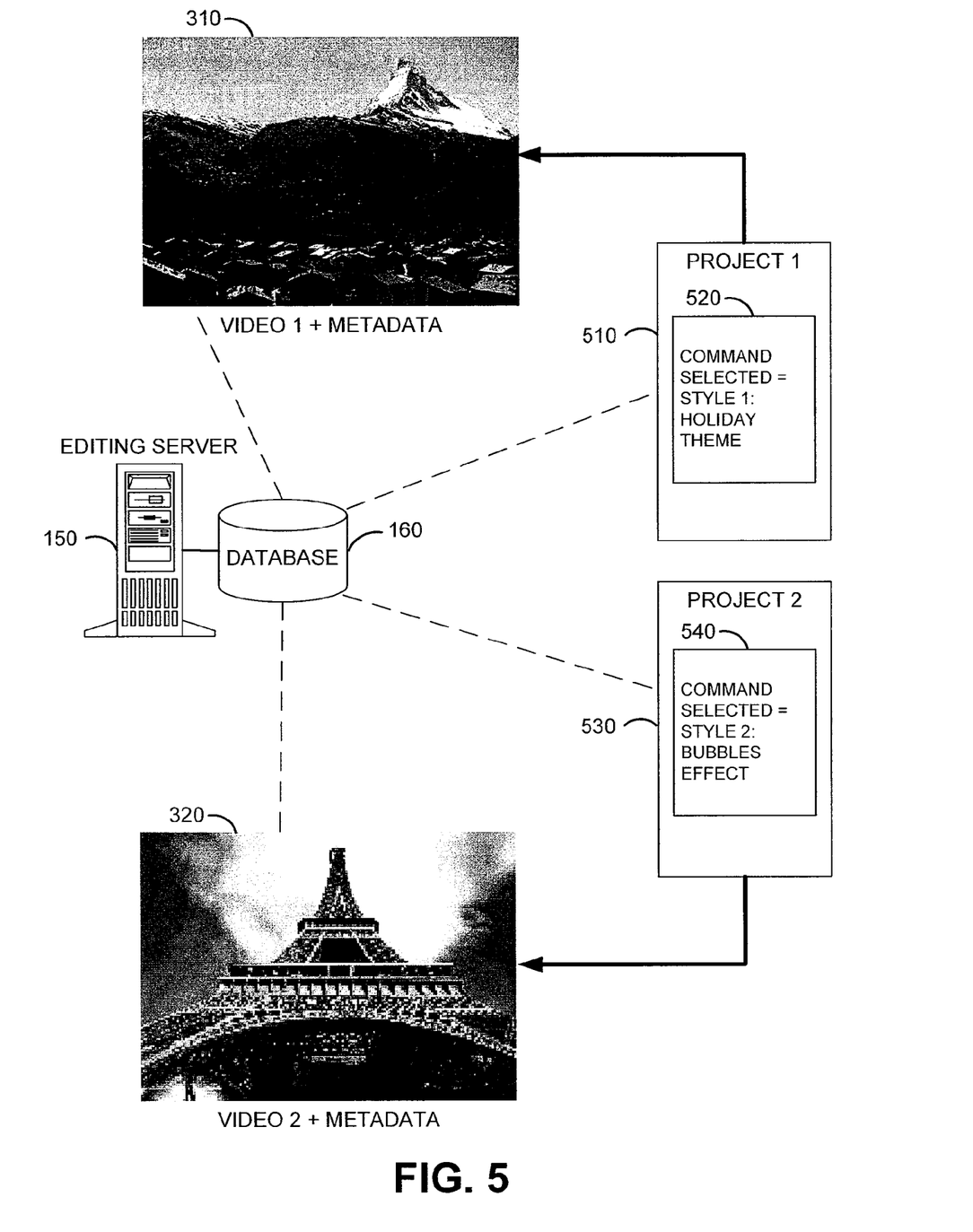
FIG. 5 depicts a block diagram of project files linked to corresponding video files.

FIG. 5 depicts a block diagram of project files linked to corresponding video files. Upon receipt of edit instructions by various clients 110, 120, 130, new project files 510, 530 for each client are created and stored at the edit server 150 within a database 160. Each project file 510, 530 contains edit instructions 520, 540. Note that in certain embodiments of the invention, the edit instructions will be encapsulated as "styles" which the client simply selects. The styles in this case are simply a pre-defined set of editing instructions. The project files 510, 530 are then linked to the corresponding target video files 310, 320 to be edited. Note that a separate copy of the video file 310, 320 is not stored within each project file 510, 530. That is, only one copy of each particular video file 310, 320 is stored within the database 160 on the editing server 150. One should also note that it possible for multiple project files 510, 530 to link to the same video file 310, 320. Upon playback to the client 110, 120, 130, the project file 510, 530 is retrieved and the corresponding target video 310, 320 is processed.

By way of example, FIG. 5 shows "Project 1" 510, which contains the edit instruction 520 specifying a holiday style to be incorporated into the target video file 310. The target video file 310 is comprised of a video and corresponding metadata, which was generated either by the client 110, 120, 130 or by the editing server 150. Note that in one embodiment, the video file 310, 320 may be comprised of the video that was uploaded and a link to its associated metadata. In an alternate embodiment, the metadata may be embedded into video file 310, 320 along with the video that was uploaded. Upon playback, the client 110, 120, 130 that submitted the edit instruction 520 will view the target video file 310 with the holiday style incorporated. Likewise, "Project 2" 530 contains the edit instruction 540 specifying a bubbles effect to be incorporated into the target video file 320. Upon playback, the client 110, 120, 130 that submitted the edit instruction 540 will view the target video file 320 with a bubbles effect incorporated.

Figure 6:
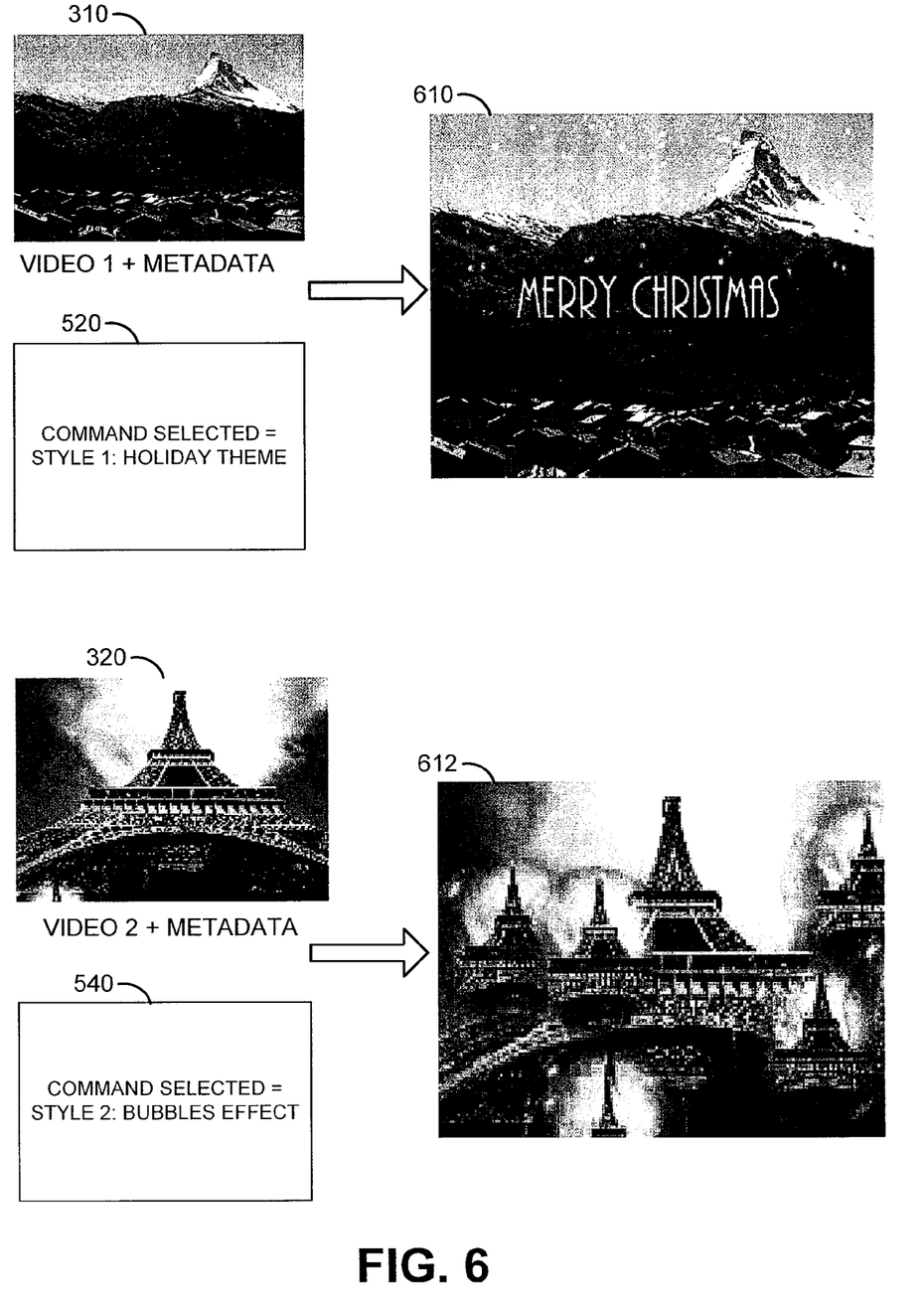
FIG. 6 is a block diagram illustrating the creation of a video with special effects.
Figure 7:
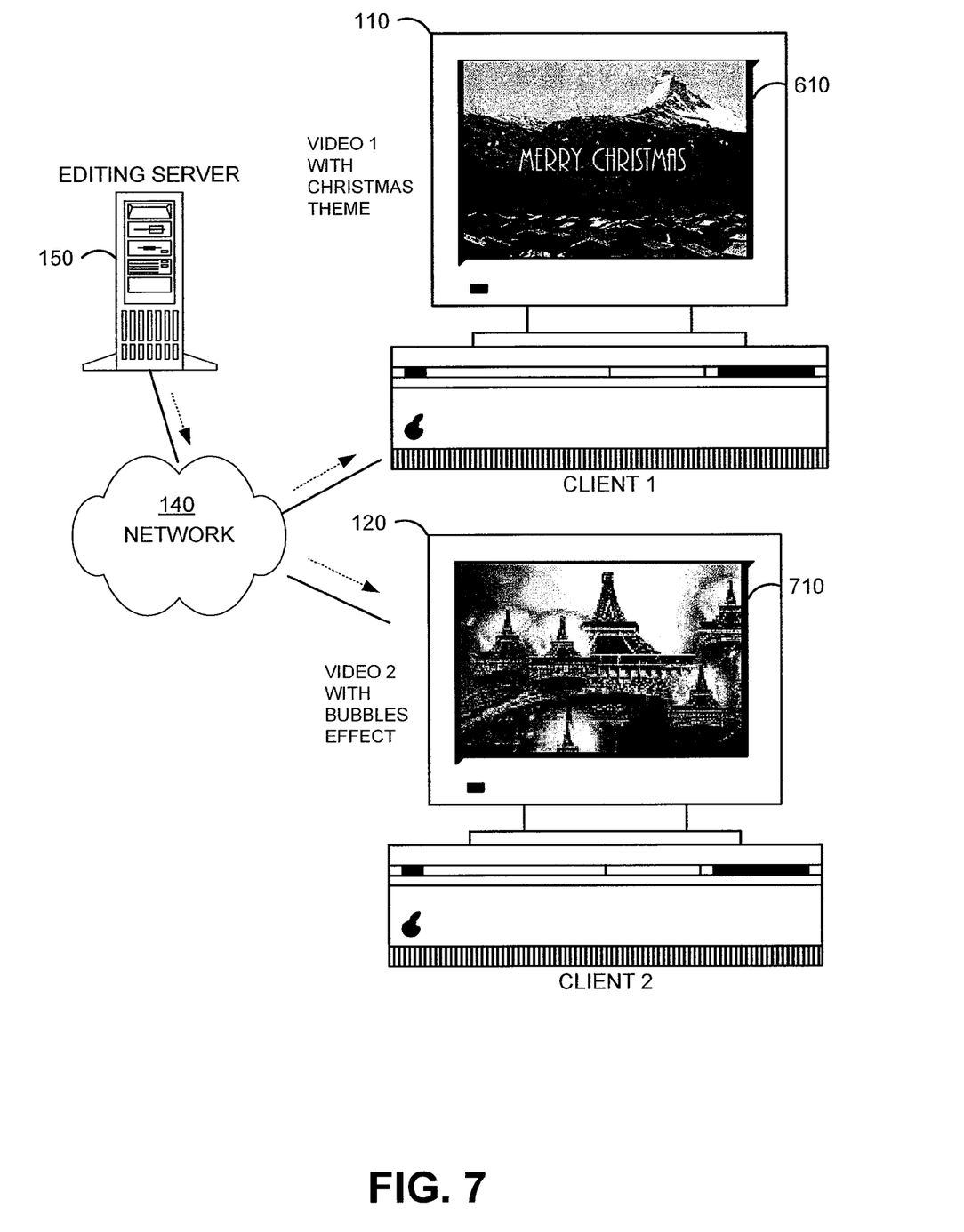
FIG. 7 is a block diagram illustrating how a modified video is transmitted to various clients.

FIG. 6 is a block diagram illustrating the creation of a video with special effects. The editing engine 170 within the editing server 150 incorporates the special effects command 520 specified in the project file 510 into a copy of the target video file 310. The resulting video 610 contains the original video content combined with the special effects selected. By way of example, FIG. 6 shows the "holiday" theme special effect 520 incorporated into a copy of the target video file 310, resulting in a modified video 610 with a scrolling "Merry Christmas" greeting and snow flurries falling in the background. Likewise, the "bubbles" special effect 540 is incorporated into a copy of the target video file 320, resulting in a modified video 612 with bubbles floating in the video. FIG. 7 is a block diagram showing the modified video being transmitted to various clients 110, 120, 130. Upon completion of the editing process, the modified video 610, 710 is transmitted to each respective client 110, 120, 130 that submitted the edit instructions. The video is transmitted by the editing server 150 over the network 140. It is important to note that the target videos files 310, 320 are not modified.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for remotely editing a video comprising the steps of:
   storing the video at an editing server in a video file;
   analyzing characteristics of the video and storing the characteristics as metadata associated with the video, wherein the characteristics are comprised of at least one of brightness level, contrast level, detection of faces, detection of motion, and detection of objects within the video;
   receiving edit instructions from a client at the editing server;
   creating, by the editing server, a project file containing the edit instructions received; and
   editing video based on the project file and the video file, wherein the edit instructions are generated at the client based on each of:
      selecting a portion of the video exhibiting target characteristics among the analyzed characteristics and displaying the selected portion of the video exhibiting the target characteristics; and
      displaying at least one style corresponding to the analyzed characteristics, wherein the at least one style comprises a pre-defined set of edit instructions; and
   wherein the edit instructions are incorporated into the video based on the analyzed characteristics.

2. The method of claim 1, further comprising the step of archiving the video file within the editing server upon transmitting an edited video to the client.

3. The method of claim 1, wherein the project file contains a link to the video file to be edited.

4. The method of claim 3, wherein the video file is comprised of the video and a link to the associated metadata.

5. The method of claim 3, wherein the video file is comprised of the video and associated metadata.

6. The method of claim 1, wherein the step of analyzing the characteristics of the video is performed by the client.

7. The method of claim 1, wherein the step of analyzing the characteristics of the video is performed by the editing server.

8. A system for remotely editing a video comprising:
   an analysis module for identifying characteristics of the video and associating the characteristics with the video, wherein the characteristics are comprised of at least one of brightness level, contrast level, detection of faces, detection of motion, and detection of objects within the video; and an editing server for storing the video in a video file, creating a project file based on edit instructions, editing video based on the project file and video file, and transmitting the edited video to a client, wherein the edit instructions are generated at the client based on each of:

selecting a portion of the video exhibiting target characteristics among the analyzed characteristics and displaying the selected portion of the video exhibiting the target characteristics; and displaying at least one style corresponding to the analyzed characteristics, wherein the at least one style comprises a pre-defined set of edit instructions, and wherein the edit instructions are incorporated into the video based on the analyzed characteristics.

9. The system of claim 8, wherein the editing server stores the project file for future access.

10. The system of claim 8, wherein the editing server stores the video and a link to the associated characteristics in the video file.

11. The system of claim 8, wherein the editing server stores the video and the associated characteristics in the video file.

12. The system of claim 8, wherein the editing server only stores the original video upon transmitting the edited video to the client.

13. The system of claim 8, wherein the client is coupled to the editing server through a network.

14. The system of claim 8, wherein the analysis module is located in the editing server.

15. The system of claim 8, wherein the analysis module is located in the client.

16. A system for remotely editing a video comprising, comprising:

at least one client for analyzing characteristics of a video, and generating edit instructions; and an editing server in communication with the plurality of clients, the editing server configured to receive the edit instructions, create project files, edit the video based on the project file, wherein the edit instructions are incorporated into the video based on the analyzed characteristics, wherein the characteristics are comprised of at least one of brightness level, contrast level, detection of faces, detection of motion, and detection of objects within the video, wherein the edit instructions are generated at the client based on each of:

selecting a portion of the video exhibiting target characteristics among the analyzed characteristics and displaying the selected portion of the video exhibiting the target characteristics; and displaying at least one style corresponding to the analyzed characteristics, wherein the at least one style comprises a pre-defined set of edit instructions.

17. The system of claim 16, wherein the editing server is further configured to store the project files for future access.

18. A non-transitory computer-readable medium having a computer program for remotely editing a video when executed by a computer, the computer program comprising:

logic configured to store the video as a video file;

logic configured to identify characteristics of the video and associate the characteristics with the video, wherein the characteristics are comprised of at least one of brightness level, contrast level, detection of faces, detection of motion, and detection of objects within the video;

logic configured to cause the computer to process edit instructions for modifying the video file;

logic configured to create a project file; and logic configured to modify the video file based on the project file, wherein the edit instructions are generated at the client based on each of:

selecting a portion of the video exhibiting target characteristics among the analyzed characteristics and displaying the selected portion of the video exhibiting the target characteristics; and displaying at least one style corresponding to the analyzed characteristics, wherein the at least one style comprises a pre-defined set of edit instructions, and wherein the edit instructions are incorporated into the video based on the analyzed characteristics.

19. The non-transitory computer-readable medium of claim 18, further comprised of logic configured to transmit the modified video file to the client requesting the video.

20. The non-transitory computer-readable medium of claim 18, wherein the project file is comprised of the edit instructions.

21. The non-transitory computer-readable medium of claim 18, wherein the project file is comprised of at least one of the following:

custom commands generated by the client; and selections from a set of pre-defined edit instructions.

22. The non-transitory computer-readable medium of claim 18, wherein the video file is comprised of the video and a link to its associated characteristics.

23. The non-transitory computer-readable medium of claim 18, wherein the video file is comprised of the video and its associated characteristics.

* * * * *